Patented Apr. 25, 1944

2,347,562

UNITED STATES PATENT OFFICE 2,347,562

HIGH MOLECULAR WEIGHT POLYHYDRIC ALCOHOL

William B. Johnston, Stamford, Conn., assignor to American Cyanamid Company, New York, N. Y., a corporation of Maine No Drawing. Application May 31, 1940, Serial No. 338,282

12 Claims. (Cl. 260—617)

This invention relates to polyhydric alcohols of relatively high molecular weight and to processes of producing the same.

An object of this invention is to prepare high molecular weight polyhydric alcohols from the natural fatty oils and, more particularly, substances derived therefrom.

This and other objects are attained by polymerizing an ester of a polyene fatty acid at elevated temperature and converting the polymer to the corresponding alcohol by hydrogenolysis. In this way glycols containing 36 carbon atoms and trihydric alcohols containing 54 carbon atoms may be produced.

The following examples in which the proportions are in parts by weight are given by way of illustration and not in limitation.

Example 1

800 parts of the methyl esters of tung oil fatty acids are heated, preferably in an atmosphere of carbon dioxide or other inert gas, to a temperature of about 300° C. in approximately 40 minutes and the temperature is maintained at this point for about one-half hour. The relatively volatile and unpolymerized esters are removed by distillation at about 1–5 mm. of mercury absolute pressure, the temperature being gradually raised to about 300° C., leaving a residue containing 415–420 parts of non-volatile polymerized esters.

To 200 parts of the polymerized esters thus obtained 20 parts of copper chromite catalyst are added and the mixture is placed in a suitable pressure vessel and charged with hydrogen to a pressure of about 1900 pounds per square inch. The temperature is raised to about 250° C. and maintained at that point for around 14 hours, during which time the pressure decreases from about 3200 pounds per square inch (the pressure attained after heating to 250° C.) to 1600 pounds per square inch as a result of hydrogen absorption. The reaction vessel is cooled and the excess hydrogen is released. The product may be diluted with a small amount of a suitable solvent, e. g., acetone, to decrease the viscosity and the catalyst may then be conveniently removed by filtration. The acetone is evaporated from the filtrate and about 10 parts of acid-treated bentonite ("Filtrol") are added, the resulting mixture is agitated and the temperature is raised to about 120° C. for 20 minutes. The mixture is filtered hot and the filtrate which is obtained contains a mixture of polyhydric alcohols. It is a viscous, straw-colored liquid having the following properties:

| | |
|---|---|
| Refractive index at 25° C | 1.4952 |
| Specific gravity at $\frac{25° C}{15.5}$ | 0.9383 |
| Wijs iodine value | 50.5 |
| Hydroxyl No | 186.6 |
| Saponification No | 14.1 |
| Molecular weight (Rast method) | 555 |

A consideration of these properties indicates that the product contains less than about 10% of unreduced polymerized esters and that the principal constituent is a glycol which contains about one carbon to carbon double bond per average molecule.

Example 2

1000 parts of the methyl esters of the fatty acids of dehydrated castor oil, the major proportion of which contains the methyl ester of 9,11- and 9,12-octadecadienic acid, are polymerized at 300° C. for about 5 hours in an inert atmosphere. The volatile and unpolymerized esters are removed by distillation at 1–5 mm. of mercury absolute pressure, the temperature being gradually raised to about 300° C., leaving as a residue about 650–660 parts of non-volatile polymerized esters.

300 parts of the polymerized esters thus obtained are hydrogenated in the presence of about 20 parts of copper chromite catalyst in the same manner as described in Example 1. The hydrogenated product may be purified by filtration as set forth in Example 1, thus producing a pale, straw-colored liquid of slightly lower density and viscosity than that obtained according to Example 1. This product possesses the following properties:

| | |
|---|---|
| Refractive index at 25° C | 1.4846 |
| Specific gravity at $\frac{25° C}{15.5}$ | 0.9167 |
| Wijs iodine value | 38.5 |
| Hydroxyl No | 189.7 |
| Saponification No | 19.5 |
| Molecular weight (Rast method) | 550 |

Example 3

2000 parts of the methyl esters of the fatty acids of soya-bean oil are mixed with 200 parts of activated bentonite ("Super-Filtrol") and the mixture is heated, preferably in an inert atmosphere at about 280° C. for about one-half hour. The product is filtered and the volatile and unpolymerized esters are removed by distillation at 1–5 mm. of mercury absolute pressure, the temperature being gradually raised to about 300° C., leaving as a residue about 835–840 parts of polymerized esters. The polymerized esters thus obtained are hydrogenated in the presence of a copper chromite catalyst as described in Example 1 and the hydrogenated product is purified in the same manner as that set forth in that example. The mixture of polyhydric alcohols thus obtained has the following properties:

| | |
|---|---|
| Refractive index at 25° C | 1.4900 |
| Specific gravity at $\frac{25° C}{15.5}$ | 0.9160 |
| Wijs iodine value | 55.7 |
| Hydroxyl No | 185.8 |
| Saponification No | 17.6 |

Example 4

A crude mixture of polyhydric alcohols prepared in accordance with Example 2 is distilled at temperatures varying between 100° C. and 290° C. and at a pressure of about 2 microns of mercury absolute pressure in a molecular still. This still is preferably one of the cyclic type. For a description of stills of this general type, as well as the cyclic still, reference is made to the patent of Oosterhof et al. No. 2,065,728, of December 29, 1936, and to the article by Hickman, entitled "Apparatus and methods," Ind. & Eng. Chem., 29, 968 et seq. (1937). The following fractions and properties are obtained:

| Fraction | Percent yield | n/D 25° C. | Sp. g. 25° C. / 25 | Viscosity poises 25° C. | Rast mol. wt. | Sap. No. | Hydroxyl No. 1 hr. reflux | 2 hr. Kaufmann iodine No. |
|---|---|---|---|---|---|---|---|---|
| A | | 1.4824 | 0.9105 | 46.3 | | 11.4 | 198 | 19.3 |
| 1 | 4.2 | 1.4705 | | Solid, waxy | | 3.5 | 198 | 6.6 |
| 2 | 8.2 | 1.4788 | 0.9030 | Turbid paste | | 5.4 | 198 | 11.6 |
| 3 | 30.4 | 1.4817 | 0.9068 | Sl. turbid—27.0 | 480 | 5.1 | 200 | 11.2 |
| 4 | 18.4 | 1.4821 | 0.9098 | 36.2 | 495 | 4.8 | 200 | 11.0 |
| 5 | 5.4 | 1.4830 | 0.9108 | 46.3 | 507 | 4.8 | 198 | 13.6 |
| 6 | 5.2 | 1.4857 | 0.9165 | | 530 | 2.5 | 190 | 23.6 |
| B | 17.9 | 1.4884 | 0.9223 | 148.0 | 816 | 13.6 | 178 | 27.4 |

A=Original crude mixture.
B=Undistilled residue.

An ultra-violet absorption spectra of each fraction indicates that fraction No. 4 is most nearly homogeneous and an ultimate analysis showed:

Carbon $\begin{cases} 80.65\% \\ 80.96\% \end{cases}$  Hydrogen $\begin{cases} 13.28\% \\ 13.29\% \end{cases}$ and molecular refraction, 168.4. The theoretical for the fully saturated glycol (IV), $C_{36}H_{70}(OH)_2$, is C=80.52%, H=13.51%, molecular refraction, 167.6 and for the corresponding monounsaturated glycol (III) of iodine number 47.5 and composition $C_{36}H_{68}(OH)_2$, is C=80.82%, H=31.91%, molecular refraction, 167.2. This fraction contains 2.5% of ester impurity and is indicated to comprise a mixture of approximately 77.2% of the saturated glycol (IV), $C_{36}H_{70}(OH)_2$, and 20.3% of the corresponding glycol $C_{36}H_{68}(OH)_2$ (III) containing one double bond per mol.

The solid, waxy nature of fraction No. 1 and the appearance of decreasing amounts of this impurity in fractions 2 and 3 respectively is apparently due to the stearyl alcohol contained in these fractions, the formation of which can be accounted for by the presence of small amounts of unpolymerized methyl oleates or linoleates in the original crude polymer prior to its hydrogenation.

The undistilled residue represents the polyhydric alcohols derived from the polymerized esters of higher molecular weight than dimers such as are formed in relatively minor proportions, together with the more predominant dimers during the thermally induced polymerization of the original esters. This residue is evidently composed of the trihydric alcohol $C_{54}H_{101}(OH)_3$ and

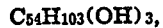

$$C_{54}H_{103}(OH)_3,$$

together with 7.1% of trimerized ester impurities since the calculated molecular refraction is 249.9 and the observed value, 250.3; the calculated ultimate analysis is 80.63% carbon, 13.03% hydrogen and the determined value, 80.73% carbon and 12.99% hydrogen. The hydroxyl value is determined as 178 after the standard one hour of acetylation but by three hours of refluxing, it attains the theoretical. As the molecular weight of these alcohols and esters increases through polymerization, esterification and saponification reactions evidently become more sluggish.

The presence of three hydroxyl groups in this residual alcohol molecule is not only shown by the observed molecular weight, molecular refraction, ultimate analyses and hydroxyl value, but confirmed by gelation tests. It is well known in the alkyd resin art that trihydroxy alcohols combine with dicarboxylic acids to yield polyesters of the convertible or gelable type whereas dihydric alcohols react with acids not containing active unsaturated groups under similar conditions to yield only thermoplastic or non-convertible polymers. When 62 parts by weight of the residual alcohol fraction are mixed with 15 parts by weight of phthalic anhydride and heated at 200° C., an infusible gelled polyester is obtained within one hour, thereby indicating that the alcohol contains at least three hydroxyl groups.

While the structure of these trihydric alcohols has not been definitely established, they are believed from many considerations to be substituted, nearly saturated hydrobiphenyl compounds substantially as represented in figures VI and VII or isomeric therewith.

In illustration of the most probable chemistry involved and of the general type of structure of the products of this invention (yet without specific limitation thereto), the several steps of Example 2 may be considered to progress as follows:

1(a) 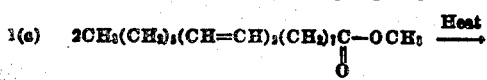

2 mols methyl ester 9,11-octadecadienic acid (originally present and/or formed by isomerization of 9,12 isomer)

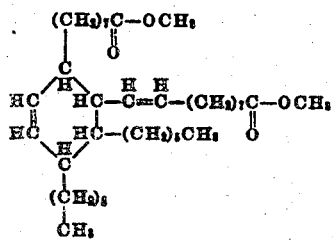

I
Dimerized ester (b) (I) + H₂ ⟶

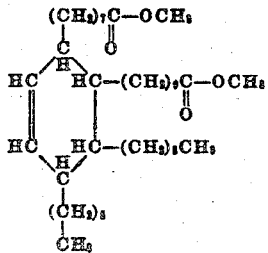

II
Partially saturated dimerized ester (c) (II) + 3H₂ $\xrightarrow{\text{Cu-chromite}}$ 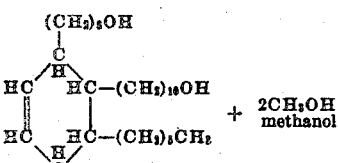 + 2CH₃OH methanol III
Unsaturated glycol C₃₆H₆₈(OH)₂

(d) (III) + H₂ $\xrightarrow{\text{Cu-chromite}}$

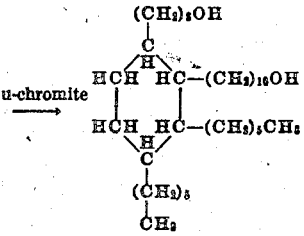

IV
Saturated glycol C₃₆H₇₀(OH)₂

2(a) 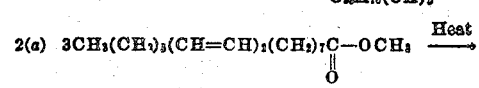

3 mols methyl octadecadienate (linoleate)

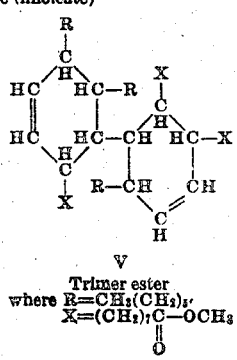

V
Trimer ester
where R=CH₃(CH₂)₄
X=(CH₂)₇C—OCH₃
              ‖
              O (q) (V) + 7H₂ $\xrightarrow{\text{Cu-chromite}}$

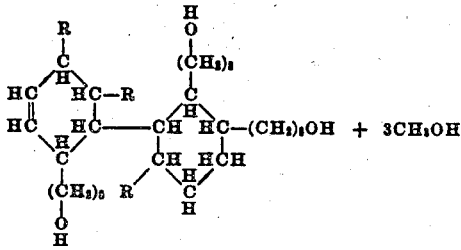 + 3CH₃OH

VI
Half saturated trimer alcohol
C₅₄H₁₀₁(OH)₃
where R=CH₃(CH₂)₄

(c) (VI) + H₂ $\xrightarrow{\text{Cu-chromite}}$

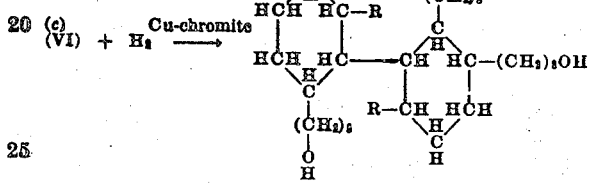

VII
Saturated trimer alcohol
C₅₄H₁₀₃(OH)₃
where R=CH₃(CH₂)₄

The physical constants and characteristics of these new polyhydric alcohols are those which one would expect to find in cyclized molecules of the indicated structure rather than in straight chain molecules of comparable molecular weights. The latter are generally wax-like solids rather than viscous liquids.

The polyhydric alcohol as produced in Example 1 is characterized by a greater density and viscosity, yet not of greater molecular weight, than those obtained in Examples 2 and 3, in common with those which have been derived from linolenic or other esters of the octadecatrienic acids, and is thought to exhibit such differences because of a bi-cyclic hydronaphthalene configuration rendered possible by the higher initial degree of unsaturation of the reactants. The exact configuration of this glycol, as in the preceding case, is not definitely known but it is thought most likely to be that of Figure VIII, or isomeric therewith:

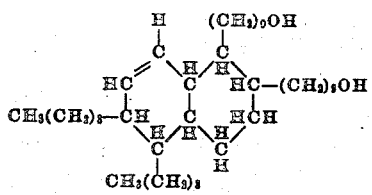

VIII
Glycol (from methyl eleostearate dimer) C₃₆H₆₂(OH)₂

Any polyene fatty acid or its esters or mixtures thereof in any desired proportion or as they happen to occur in the natural drying oils may be treated in the same manner as set forth in the above examples to produce polyhydric alcohols. The most important of these are the octadecadienic or octadecatrienic fatty acids or their esters, but the polymeric fatty acids containing 20, 22 and 24 carbon atoms found in fish oils are also suitable, as well as the relatively short chain aliphatic fatty acids, e. g., sorbic acid. The lower monohydric alcohol esters of the polyene carboxylic acids are preferred, but the acids themselves, as well as the glycol esters and the glycerides, may be used. The acids themselves tend to decompose, particularly at the carboxyl groups and therefore are generally undesirable from a commercial point of view. On the other hand, the glycerides and, to a lesser extent, the glycol esters tend to gel before the polymerization reaction is completed. Accordingly, only small yields are usually obtainable. Even aromatic or heterocyclic esters may be used, such as the benzyl or furfuryl esters, but in general there is no particular advantage in their use. While the higher aliphatic alcohol, for example, stearyl alcohol, esters may be employed, it has generally been found that somewhat better results are obtained if the lower aliphatic alcohol esters be used. Accordingly, the preferred esters are those derived from methanol, ethanol, propanol, etc.

Examples of the polyene fatty acids, the esters of which are polymerized and then subjected to hydrogenolysis are the following: 9,11- and/or 9,12-octadecadienic acids (obtainable from perilla oil, linseed oil and other drying oils), alpha- and beta-eleostearic acids (obtainable from tung oil), etc.

If esters of the polyene fatty acids be employed, such esters may be produced by direct esterification of the fatty acids with the alcohol which has been selected, but it is generally more economical and more convenient to produce the esters by mixing the alcohol with a natural drying oil, together with a trace of alkali hydroxide, hydrogen chloride, or other esterification catalyst and thereby effect an alcoholysis or ester interchange by simply heating.

If methyl or ethyl esters of the polyene acids be utilized, I have found that temperatures between about 250° C. and about 350° C. are suitable for the polymerization. The time required for this polymerization varies not only with the temperature but with the acid and the particular ester which is used. Generally a period of from about one-half hour to about 50 hours is suitable and in most instances, the polymerization may be effected in not over 12 hours. If a conjugated unsaturated ester, such as the methyl ester of eleostearic acid be employed, a sufficient degree of polymerization may be obtained within one-half to one hour at about 300° C., whereas the methyl linolenates and linoleates generally require from about 5 to 12 hours or more. To speed up the polymerization process, suitable catalysts may be added, examples of which are: Fuller's earth (preferably acid-treated), bentonite (preferably acid-treated), stannic chloride, etc. If catalysts be employed, it is sometimes possible to use lower temperatures and/or shorter periods of time than those indicated above.

In general, I prefer to conduct the polymerization in an inert atmosphere of carbon dioxide, nitrogen or other inert gas. The polymerization is preferably continued until the refractive index, density and average molecular weight approach constant values. At this point, the polymerized esters are separated from the unpolymerized esters by any suitable method. In the above examples I have suggested the separation of these esters by distilling off the unpolymerized esters at an absolute pressure of about 1-5 mm. of mercury and at temperatures up to about 300° C. Another way in which this separation may be effected is by extraction with methanol or other suitable solvent. This separation or purification step may be omitted if a product be desired containing a mixture of alcohols, i. e., not only the polyhydric alcohols which are the subject of this invention, but also monohydric alcohols, such as stearyl alcohol. Such mixtures are of use for reaction with carboxylic and other acids, as in the preparation of resinous materials, and for many other purposes. Generally the crude polymerized esters contain about 30% to about 75% of polymeric esters.

The polymerized esters are hydrogenated to convert them into the corresponding alcohols by hydrogenolysis, thereby obtaining glycols having the same number of carbon atoms as the acid radicals of the polymeric esters. The hydrogenation may be carried out in any ordinary high pressure hydrogenation equipment and either by the static or continuous flow methods. In order to effect the conversion of the polymeric ester into a polyhydric alcohol, a hydrogenolysis catalyst is necessary. The complex copper chromite catalysts have been found to be the most desirable, although other catalysts of the same type may be used, e. g., zinc chromite catalysts. In general a reaction temperature of 200-250° C. and a hydrogen pressure of 100-500 atmospheres is suitable in carrying out this reaction. In some instances, it may be desirable to hydrogenate the polymeric ester in the presence of an ordinary hydrogenation catalyst, e. g., a nickel catalyst, to saturate the carbon to carbon double bonds prior to a second hydrogenation with a chromite catalyst to effect the hydrogenation of the ester group. In this way, the characteristics of the final products may be varied to some extent for various purposes.

My products are all substantially insoluble in water but soluble in and miscible with ethanol and the higher alcohols, e. g., stearyl alcohol, as well as in benzene, toluene, xylene, ethyl ether, petroleum distillates and in many other esters generally used as solvent materials. While the glycols are generally soluble in methanol, the trihydric alcohols are virtually insoluble in methanol.

The mixtures of polyhydric alcohols or the mixtures of polyhydric alcohols and monohydric alcohols which are produced according to my invention may be used alone or in esterified form as plasticizing agents for ethyl cellulose, nitrocellulose, shellac, phenol-formaldehyde resins, alkyd resins, amino-aldehyde resins, e. g., urea-formaldehyde resins, etc. They may be reacted with monocarboxylic acids to produce esters of value as plasticizers or modifiers in coating compositions and they may be reacted with polycarboxylic acids for the production of alkyd resins. Furthermore, they may be sulfated or sulfonated to yield products useful as wetting, emulsifying and dispersing agents. My products have good water and alkali resistance and since they are also substantially non-volatile, they are of unusual value as plasticizing agents and as starting materials or modifiers for natural and synthetic resins.

Obviously many modifications and variations in the processes and compositions described above may be made without departing from the spirit and scope of the invention as defined in the appended claims.

I claim:

1. A process for the production of a high molecular weight polyhydric alcohol from the natural fatty oils and substances derived therefrom which comprises polymerizing at elevated temperature a substance selected from the group consisting of polyene fatty acids and their monohydric alcohol esters and hydrogenating the polymer at a temperature at least about 200° C. to the corresponding alcohol in the presence of a hydrogenolysis catalyst selected from the group consisting of copper chromite and zinc chromite.

2. A process for the production of a high molecular weight polyhydric alcohol from the natural fatty oils and substances derived therefrom which comprises polymerizing at elevated temperature a substance selected from the group consisting of polyene fatty acids and their monohydric alcohol esters and hydrogenating the polymer at a temperature at least about 200° C. to the corresponding alcohol in the presence of a copper chromite catalyst.

3. A process for the production of a high molecular weight polyhydric alcohol from the natural fatty oils and substances derived therefrom which comprises polymerizing at elevated temperature the methyl esters of tung oil fatty acids and hydrogenating the polymer at a temperature at least about 200° C. to the corresponding alcohol in the presence of a copper chromite catalyst.

4. A process for the production of a high molecular weight polyhydric alcohol from the natural fatty oils and substances derived therefrom which comprises polymerizing at elevated temperature the methyl esters of the fatty acids of dehydrated castor oil and hydrogenating the polymer at a temperature at least about 200° C. to the corresponding alcohol in the presence of a copper chromite catalyst.

5. A process for the production of a high molecular weight polyhydric alcohol from the natural fatty oils and substances derived therefrom which comprises polymerizing at elevated temperature the methyl esters of the fatty acids of soya-bean oil and hydrogenating the polymer at a temperature at least about 200° C. to the corresponding alcohol in the presence of a copper chromite catalyst.

6. A product prepared by polymerizing at elevated temperature a substance selected from the group consisting of polyene fatty acids and their monohydric alcohol esters and hydrogenating the polymer at a temperature at least about 200° C. to the corresponding alcohol in the presence of a copper chromite catalyst.

7. A product prepared by polymerizing at elevated temperature the methyl esters of tung oil fatty acids and hydrogenating the polymer at a temperature of at least about 200° C. to the corresponding alcohol in the presence of a copper chromite catalyst.

8. A product prepared by polymerizing at elevated temperature the methyl esters of the fatty acids of dehydrated castor oil and hydrogenating the polymer at a temperature at least about 200° C. to the corresponding alcohol in the presence of a copper chromite catalyst.

9. A product prepared by polymerizing at elevated temperature the methyl esters of the fatty acids of soya-bean oil and hydrogenating the polymer at a temperature at least about 200° C. to the corresponding alcohol in the presence of a copper chromite catalyst.

10. A product prepared by polymerizing at elevated temperature a substance selected from the group consisting of polyene fatty acids and their monohydric alcohol esters and hydrogenating the polymer at a temperature of at least about 200° C. to the corresponding alcohol in the presence of a hydrogenolysis catalyst selected from the group consisting of copper chromite and zinc chromite.

11. A process for the production of a high molecular weight polyhydric alcohol from the natural oils and substances derived therefrom which comprises polymerizing at elevated temperature a methyl ester of a polyene fatty acid and hydrogenating the polymer at a temperature of at least 200° C. to the corresponding alcohol in the presence of a hydrogenolysis catalyst selected from the group consisting of copper chromite and zinc chromite.

12. A product prepared by polymerizing at elevated temperature a methyl ester of a polyene fatty acid and hydrogenating the polymer at a temperature of at least about 200° C. to the corresponding alcohol in the presence of a hydrogenolysis catalyst selected from the group consisting of copper chromite and zinc chromite.

WILLIAM B. JOHNSTON.